May 28, 1963    J. W. HONODEL    3,091,085
HYDRAULICALLY ACTUATED CONTROLLER
Filed Nov. 29, 1960

James W. Honodel
INVENTOR.

BY *Clarence A. O'Brien*
*and Harvey B. Jacobson*
Attorneys

United States Patent Office 3,091,085
Patented May 28, 1963

3,091,085
HYDRAULICALLY ACTUATED CONTROLLER
James W. Honodel, 915 Central Drive,
Coulee Dam, Wash.
Filed Nov. 29, 1960, Ser. No. 72,395
6 Claims. (Cl. 60—54.5)

This invention relates to an automatic control device especially designed to instantaneously respond to static fluid pressure for controlling power equipment associated therewith.

It is a primary object of this invention to provide a hydraulic control device which will automatically operate a control device for power equipment or the like in response to two different internally predetermined pressures to which the device is exposed by submersion within or by other type of connection to a pressure medium which may be influenced by the power equipment controlled by the controller device.

Another object of this invention is to provide a controller device responding to variable pressures of a fluid medium which is rugged, compact, and sensitive to a degree heretofore not possible with previous controller devices used in installations for which the present invention is designed. The controller device of this invention therefore will not be subject to difficulties otherwise encountered by previous controller devices due to floating debris, sand, silt, icing, water scale, rust or loss of vertical alinement.

An additional object of this invention is to provide a reliable hydraulic control device which may be submerged within the liquid to be controlled, adjusted, preset and operative in any position rendering it extremely versatile as to installations to which it may be applied. The operating parts of the controller device are therefore sealed and hence not affected by external conditions such as temperature, foreign jamming materials or fluid turbulence and currents. The control device may therefore be applied to such widely varying installations and control purposes as for controlling city water systems, loading of vessels, petroleum refining operations, atomic reactor plants, and pressure and temperature control purposes for scientific investigations in addition to one of its more important uses as a water level control for a sump pump.

The hydraulic controller device of this invention therefore, involves a completely enclosed and sealed controller body within which a microswitch device is disposed for actuation thereof by the controller device for purposes of controlling for example a power circuit. The microswitch is actuated by displacement of a displaceable volume chamber defined within the control body by a pair of diaphragms, the diaphragms forming two separated volume chambers filled by a fixed amount of non-compressible fluid. One of the diaphragms is exposed to a predetermined air or vacuum pressure within a sealed chamber in which the microswitch device is adjustably mounted. The other diaphragm is exposed to a pressure from the variable external pressure medium. The two chambers aforementioned, which are located between the diaphragms are separated by a pair of oppositely directed and adjustably spring-biased one-way valves. Accordingly, when a predetermined pressure is applied to the diaphragm exposed to the external fluid medium pressure the volume chamber adjacent thereto will be pressurized until the differential pressure acting on one of the one-way valves will open the valve so as to cause fluid within the external pressure sensing volume chamber to unrestrictedly enter the other volume chamber causing expansion of said other volume chamber and contraction of the external pressure sensing volume chamber. When the pressures in both of the volume chambers approach balance said one one-way valve will close. Accordingly, the one-way valve not only effects displacement of the volume chambers only in response to the increase in the external pressure to a predetermined value but will also fix the extent of the displacement of the volume chambers. The other of the one-way valves, will similarly control restoration of the volume chambers to their original positions when the external pressure reduces to a second predetermined value. The controller may be accurately and finely adjusted by separate spring adjusters for each of the one-way valves as well as a temperature compensated adjustment mechanism for the microswitch so as to properly position the push button contractor of the microswitch against the adjacent diaphragm. Also, the fixed volume of fluid may be predetermined by filling the volume chambers with the proper fluid through filler plugs which are subsequently sealed prior to use of the controller device. Also, the pressure or vacuum within the microswitch containing chamber may be predetermined as desired. The controller device accordingly may be rendered operative between any two desired pressure points and will be sensitive thereto as well as reliable and rugged.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
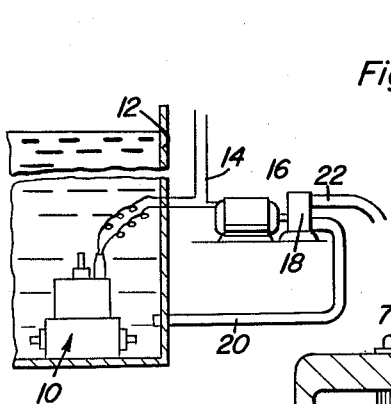
FIGURE 1 is a schematic illustration of a typical installation for the controller device of this invention.

Referring now to the drawing, it will be observed in FIGURE 1 that the controller device generally indicated by reference numeral 10 may be submerged within a liquid containing tank 12 and connected through a power control circuit 14 to an electric motor 16 for operating a pump 18 which may be connected by a conduit 20 to the tank 12 for controlling the level of the liquid therein in response to actuation of the controller device 10 submerged within the tank which senses the variations in the liquid level. It will of course be understood that the controller device 10 is not necessarily restricted to the illustrated installation of FIGURE 1. In the FIGURE 1 installation however the controller device 10 may be operative in response to the liquid level reaching a certain maximum height to close the microswitch thereof so as to energize the electric motor 16 causing operation of the pump 18 so as to withdraw liquid from the tank 12 through conduit 20 and discharge it into conduit 22. When the liquid within the tank 12 reaches a minimum value, the controller device 10 may again operate to open the microswitch so as to stop operation of the motor 16 and pump 18.

Figure 2:
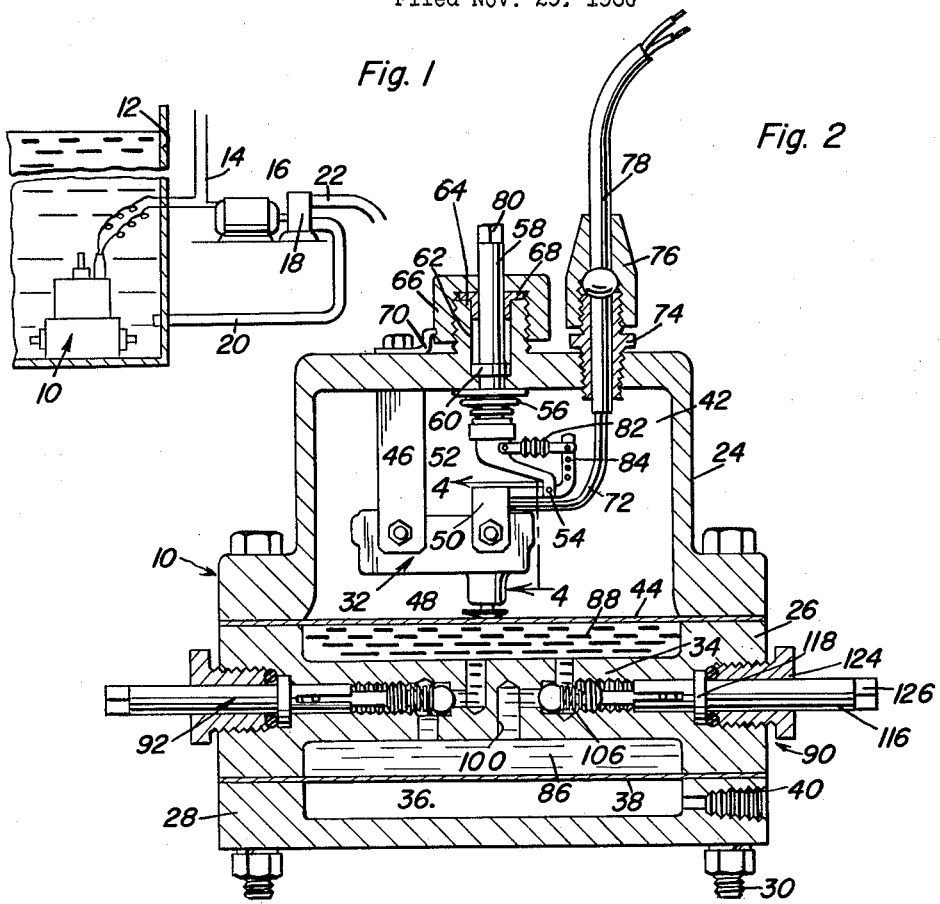
FIGURE 2 is a sectional view of the controller device of this invention illustrating the essential parts thereof in assembled relation.

Referring now to FIGURE 2 in particular it will be observed that the controller device 10 includes a valve body formed by valve body sections 24, 26, and 28. The three valve body sections are maintained in assembled relation to each other by a plurality of connecting bolt members 30. It will be observed that the body section 24 adjustably mounts within a control chamber 42 the microswitch device generally indicated by reference numeral 32 while the force transmitting body section 26 includes a valve body portion 34. The body section 28 confines therewithin the variable force sensing inlet chamber 36 within which the external pressure medium is received.

It will be observed that the body section 28 within which the inlet chamber 36 is formed, is separated from the body section 26 by a lower diaphragm member 38. The diaphragm member 38 accordingly closes the inlet chamber 36 and is exposed to the pressure of the fluid medium received therewithin for sensing pressure variations. An internally threaded inlet passage 40 therefore communicates with the inlet chamber 36. It will be apparent therefore, that when the controller device 10 is submerged within a liquid as illustrated in FIGURE 1 the liquid will enter within the chamber 36 through the passage 40. On the other hand, the controller device 10 in other installations may be connected to some medium by a conduit, the internal threaded passage 40 therefor conveniently receiving a suitable conduit fitting.

Figure 4:
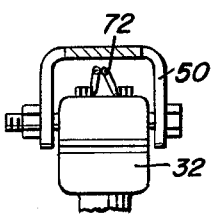
FIGURE 4 is a sectional view taken through a plane indicated by section line 4—4 in FIGURE 2.

The body section 24 within which the microswitch device 32 is mounted, forms a chamber 42 which may be filled with air under a predetermined pressure or evacuated to a predetermined extent. The chamber 42 is therefore closed by the diaphragm member 44 which is clamped between the body section 24 and body section 26. It will be observed that the microswitch device is pivotally mounted within the chamber 42 by the mounting member 46, the switch 32 including the contact member 48 which is in contact with the diaphragm member 44. Adjustable mechanism is therefore provided for properly and adjustably positioning the microswitch device 32 within the chamber 42. A clevis member 50 as more clearly seen in FIGURE 4 is therefore pivotally connected to the microswitch device 32 in spaced relation to its pivotal connection to the mounting arm 46 as seen in FIGURE 2. The member 50 is in turn pivotally connected to the member 52 by means of the pivot pin 54. The member 52 is adjustably positioned within the chamber 42 against the bias of spring 56 by means of the control shaft 58 having a threaded end threadedly received within the member 52. The control shaft 58 therefore has fixed thereto an abutment collar 60 disposed within the bore 62 of an upwardly extended externally threaded projection 64. A sealing nut member 66 is threadedly disposed about the projection 64 and effectively seals the control shaft 58 within the bore 62 thereof by means of the sealing gland member 68. A nut lock element 70 is provided for locking the nut 66 in place. It will also be observed that electrical conductors 72 which are connected to the microswitch 32 extend outwardly from the chamber 42 in sealed relation thereto by use of the threaded fitting member 74 cooperating with the nut member 76 to mount conductor cable sheathing 78.

By rotation of the control shaft member 58 by means of a tool applied to the squared end 80 thereof, the mounting member 52 may be axially positioned with respect to the control shaft member 58 for positioning the microswitch 32 with respect to the pivot mounting arm 46. The mounting clevis member 50 is however resiliently connected to the mounting member 52 by means of the bellows connecting element 82 which is temperature responsive so as to pivotally expand or retract the switch device 32 with respect to the mounting member 52 with variations in temperature. The bellows connecting member 82 is also adjustably connected to the arm 84 extending from the clevis member 50. The bellows element 82 will therefore compensate for temperature shrinkage that may occur in the diaphragm member 44 which tends to move the diaphragm member downwardly away from the switch device 32. The same temperature shrinkage will also cause the bellows to retract causing pivotal displacement of the switch device 32 downwardly so as to maintain the same relative positions between the switch device 32 and the diaphragm member 44 regardless of the temperature.

It will therefore be apparent from the foregoing, that by accurate and reliable positioning of the switch device 32 in contact with the upper diaphragm member 44 pressure applied to the lower diaphragm member 38 which is exposed to the pressure medium within the inlet chamber 36 may cause actuation of the switch device 32 when the pressure is sufficient to cause displacement of both the diaphragm member 38 and the diaphragm member 44. It will therefore be observed that the valve body 34 within the body section 26 separates two volume chambers 86 and 88 formed between the diaphragm members 38 and 44. Filler plugs, not shown, may be provided within the body section 26 for each of the volume chambers 86 and 88 so that said chambers may be filled with the predetermined and fixed amount of displacement transmitting fluid. The controller device 10 is therefore preset in a balanced condition wherein substantially equal volumes of fluid are disposed within the volume chambers 86 and 88 and are under equal pressure. In such an initial condition, there is no communication between the fluid chambers 86 and 88 by virtue of the pair of adjustable one-way valve mechanisms disposed within the valve body portion 34, which valve mechanisms are generally referred to by reference numerals 90 and 92. The one-way valve mechanisms 90 and 92 are identical in construction and are each independently adjustable but are directed to control flow between the chambers 86 and 88 in opposite directions.

Figure 3:
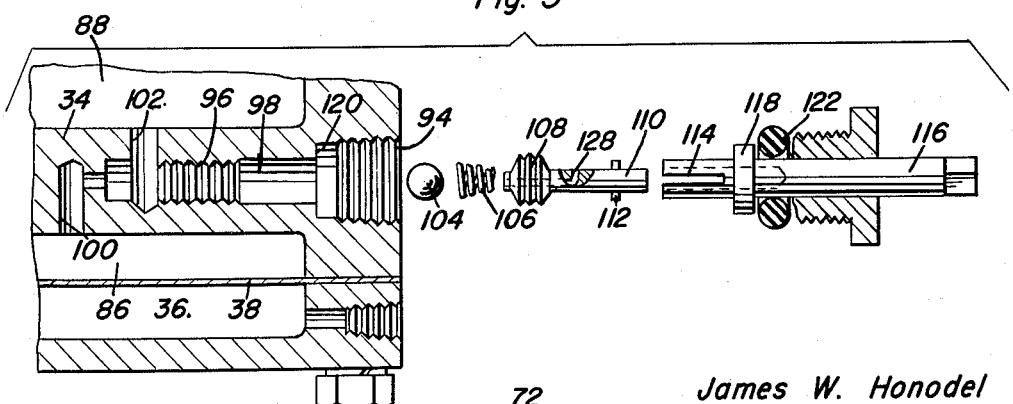
FIGURE 3 is an enlarged partial sectional view of the controller device illustrating one of the adjustable one-way valve mechanisms thereof disassembled.

The valve mechanism 90 will therefore be described in detail, it being understood of course, that such description applies similarly to the valve mechanism 92. As more clearly seen in FIGURE 3, the valve mechanism 90 includes a valve bore having a large diameter internally threaded portion 94 and a smaller internally threaded portion 96 in communication with the portion 94. The volume chamber 86 communicates with the inner end of the valve bore generally referred to by reference numeral 98 by means of an unrestricted inlet passage 100. An unrestricted outlet passage 102 also is disposed within the valve body portion 34 providing communication between the volume chamber 88 and the valve bore 98. Disposed within the inner end of the valve bore 98 is the one-way ball valve element 104. The valve ball element 104 is seated in its valve closing position as illustrated in FIGURE 2 so as to close off the inlet passage 100 from the valve bore by means of the bias of the spring element 106 which in turn is seated on an adjustably positioned threaded element 108. Accordingly, no communication is permitted between the fluid in the chambers 86 and 88 until the pressure of the fluid in chamber 86 exceeds that within chamber 88 by an amount sufficient to overcome the bias of the spring element 106 causing the one-way ball valve element 104 to open. When the valve element 104 opens the fluid within the chamber 86 will enter the chamber 88 causing expansion of the chamber 88 and contraction of the chamber 86 by virtue of which the diaphragms 38 and 44 are displaced upwardly in the same direction and at the same time. When the fluid within the chambers 86 and 88 has been displaced a sufficient amount so as to balance the pressures therewithin to a certain extent, the spring bias of spring element 106 will once again close the valve barring further communication between the chambers and hence controlling the extent of the displacement of the diaphragm members 38 and 44. By varying the bias of the spring element 106, the extent of the displacement and the pressure differential to which the valve element 104 will respond may be adjusted. Accordingly, the threaded element 108 upon which the spring 106 is seated, may be axially adjusted within the internally threaded portion 96 of the bore 98 by means of the shank 110 to which the threaded element 108 is connected. The shank 110 includes a projecting pin element 112 which is received between a slot 114 within the inner end portion of a control shaft member 116. The control shaft member is rotatable within the valve bore 98 and accordingly includes a collar portion 118 abutting against a shoulder 120 in the valve bore. A sealing member 122 is disposed up against the collar 118 and is held in locked sealed relation thereto by means of the threaded element 124. The control shaft 116 is therefore provided at its outer end with a square portion 126 for reception of a tool for rotation of the control shaft 116 to axially position the threaded element 108 in order to vary the bias of the spring 106.

Operation and utility of the control device will become apparent from the foregoing description. It will therefore be appreciated that the valve mechanisms 90 and 92 may be independently adjusted in order to obtain two different pressure points for both increasing pressure and decreasing pressure to which the controller device will respond by displacement of the diaphragms 38 and 44 to actuate the microswitch device 32. It will therefore be appreciated that the controller device of this invention relies solely on internally preset conditions for determining the external pressure values to which the controller device will respond in order to actuate the microswitch. It will also be appreciated that the construction of the controller is such as to operate without any dependence on the position of the controller device and also so arranged as to protectively encase the operating mechanisms thereof. The advantages of the present controller device over previously used devices will therefore be obvious. In connection with the valve mechanisms, it will also be observed in FIGURE 3 that an equalizing passage 128 is provided in the shank member 110 so that equal pressure will be applied to both sides of the adjustment element 108. As a result thereof, there will be no change in the volume of fluid within the chambers when adjustment of the element 108 is necessitated. The adjustable valve mechanisms, therefore are operative in conjunction with the other valve body components to provide a fluid operated actuator for the sensitive microswitch which will displace the microswitch a preset amount regardless of the pressure values to which the controller device must respond. The maximum and minimum pressures to which the controller device 10 responds merely determine the point at which the fluid actuator formed by the chambers 86 and 88 and the enclosing diaphragms acts but said pressures do not in themselves influence the manner in which the fluid actuator acts, the displacement of the fluid actuator being preset by the adjustable valve mechanisms 90 and 92. Accordingly, the controller while capable of responding to different pressures will nevertheless operate to the same extent rendering the controller more reliable and more durable than controllers heretofore used. Additionally, the adjustble mounting for the microswitch device together with the temperature compensation provided therefor render the control device of this invention highly useful and operative under extreme conditions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A controller comprising, sensing means exposed to an external variable force, control means actuatable by displacement thereof, and internal transmitting means operatively connected to the sensing means and control means for displacement by a preset amount in one direction in instantaneous response to increase of the external force on the sensing means beyond one value and displacement by said preset amount in the opposite direction instantaneously upon reduction of the external force below a second value, said transmitting means comprising a pair of separately sealed fluid filled chambers interconnected by a pair of flow passages, said chambers being respectively in contact with said external force sensing means and said control means, and flow blocking valve means operatively disposed in said pair of flow passages for directionally blocking free and continuous flow to cause simultaneous displacement of both chambers by said preset amounts in instantaneous response only to a predetermined pressure differential applied to the valve means by fluid in said chambers, said valve means comprising a pair of adjustable oppositely directed spring-biased, one-way valves interconecting said chambers.

2. The combination of claim 1, including temperature compensating mounting means for correctively positioning said control means in operative relation to the transmitting means in response to temperature changes in the transmitting means.

3. A force responsive controller comprising, a hollow body member, a pair of displaceable wall elements anchored to said body member to define therewithin: a force transmitting section between said pair of wall elements, a force sensing chamber on one side of said force transmitting section exposed to a force applying medium and a control chamber on a side of the force transmitting section opposite said force sensing chamber; a pair of pressure responsive one-way valve assemblies mounted in said force transmitting section to form a pair of displacement transmitting chambers within said force transmitting section respectively defined by said pair of wall elements and the valve assemblies and containing a fixed volume of displacement transmitting fluid, first valve adjusting means operatively connected to one of said pair of valve assemblies to provide free and continuous fluid communication between said pair of transmitting chambers in response to increase in pressure of fluid in one of said pair of transmitting chambers beyond a first predetermined value for displacement of said wall elements by a fixed preset amount from an initial position, a second valve adjusting means operatively connected to the other of said pair of valve assemblies to provide free and continuous fluid communication between said transmitting chambers in response to decrease in pressure of fluid in said one of the pair of transmitting chambers below a second predetermined value for restoring said wall elements to said initial position and displaceable control means mounted in said control chamber in contact with one of said pair of wall elements in the initial position for displacement therewith by said fixed preset amount.

4. The combination of claim 3, wherein each of said valve adjusting means includes a pressure equalizing passage for maintaining the total volume of said transmitting fluid within the force transmitting chambers constant.

5. The combination of claim 4, including temperature compensating means operatively connected to the displaceable control means for automatically adjusting the mounting thereof in the control chamber to maintain the position of the control means relative to said one of the wall elements fixed, despite thermally responsive dimensional variations in said one wall element.

6. The combination of claim 3, including temperature compensating means operatively connected to the displaceable control means for automatically adjusting the mounting thereof in the control chamber to maintain the position of the control means relative to said one of the wall elements fixed, despite thermally responsive dimensional variations in said one wall element.

References Cited in the file of this patent

UNITED STATES PATENTS

| | | |
|---|---|---|
| 2,281,538 | Leichsenring | Apr. 28, 1942 |
| 2,402,544 | Foulds | June 25, 1946 |
| 2,595,775 | De Wrangell | May 6, 1952 |
| 2,722,947 | Sragal | Nov. 8, 1955 |
| 2,805,737 | Griffin | Sept. 10, 1957 |
| 2,903,854 | Harty | Sept. 15, 1959 |
| 2,906,095 | Whitehead | Sept. 29, 1959 |
| 2,915,016 | Weaver et al. | Dec. 1, 1959 |
| 2,927,432 | Parry | Mar. 8, 1960 |
| 2,961,508 | Minneci et al. | Nov. 22, 1960 |
| 2,966,328 | Burnworth | Dec. 27, 1960 |

FOREIGN PATENTS

| | | |
|---|---|---|
| 502,900 | Great Britain | Mar. 23, 1939 |